United States Patent
Knoth et al.

(10) Patent No.: US 10,047,799 B2
(45) Date of Patent: Aug. 14, 2018

(54) SCROLL COMPRESSOR LOWER BEARING

(71) Applicant: Emerson Climate Technologies, Inc., Sidney, OH (US)

(72) Inventors: Daniel J. Knoth, Tipp City, OH (US); Nicholas J. Altstadt, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 162 days.

(21) Appl. No.: 15/092,402

(22) Filed: Apr. 6, 2016

(65) Prior Publication Data

US 2017/0097048 A1 Apr. 6, 2017

Related U.S. Application Data

(60) Provisional application No. 62/145,935, filed on Apr. 10, 2015.

(51) Int. Cl.
*F04C 29/00* (2006.01)
*F16C 35/02* (2006.01)
*F04C 18/02* (2006.01)
*F16C 17/08* (2006.01)

(52) U.S. Cl.
CPC .......... *F16C 35/02* (2013.01); *F04C 18/0215* (2013.01); *F04C 29/0085* (2013.01); *F16C 17/08* (2013.01); *F04C 2240/30* (2013.01); *F04C 2240/50* (2013.01); *F04C 2240/60* (2013.01); *F16C 2360/43* (2013.01)

(58) Field of Classification Search
CPC ...... F04C 18/02; F04C 18/0215; F04C 29/00; F04C 29/0085; F16C 17/08; F04C 35/02; F04C 2240/30; F04C 2240/50; F04C 2240/60; F04C 2360/42; F04C 2360/43

USPC ........................................................ 418/55.1
See application file for complete search history.

(56) References Cited

U.S. PATENT DOCUMENTS

| | | | |
|---|---|---|---|
| 5,931,649 A | 8/1999 | Caillat et al. | |
| 6,247,909 B1 | 6/2001 | Williams et al. | |
| 6,695,201 B2 * | 2/2004 | Narasipura | F04C 23/008 148/320 |
| 8,002,528 B2 * | 8/2011 | Hodapp | F01C 21/007 417/363 |

(Continued)

OTHER PUBLICATIONS

International Search Report regarding International Patent Application No. PCT/US2016/026763, dated Jul. 19, 2016.

(Continued)

*Primary Examiner* — Mary A Davis
*Assistant Examiner* — Dapinder Singh
(74) *Attorney, Agent, or Firm* — Harness, Dickey & Pierce, P.L.C.

(57) ABSTRACT

A compressor includes a shell, a motor assembly, a driveshaft, and a bearing assembly. The bearing assembly is disposed within the shell and supports the driveshaft for rotation. The bearing assembly includes a bracket, a hub, and a bushing. The bracket is coupled to the shell and includes an aperture. The hub is disposed within the aperture and defines a bore having a radially inwardly extending lip. The bushing includes a proximal portion and a distal portion. The distal portion of the bushing includes a plurality of radially extending engagement features. The distal portion of the bushing is disposed within the bore of the hub such that the engagement features engage the lip of the hub.

20 Claims, 5 Drawing Sheets

(56) References Cited

U.S. PATENT DOCUMENTS

| | | | |
|---|---|---|---|
| 8,342,795 B2 * | 1/2013 | Hodapp | F04C 18/0215 |
| | | | 415/182.1 |
| 8,419,393 B2 | 4/2013 | Jin | |
| 9,181,940 B2 * | 11/2015 | Cullen, Jr. | F04B 39/0044 |
| 9,528,517 B2 * | 12/2016 | Ahire | F04C 23/008 |
| 2002/0047391 A1 | 4/2002 | Nakamura et al. | |
| 2009/0238691 A1 | 9/2009 | Purdey | |

OTHER PUBLICATIONS

Written Opinion of the International Searching Authority regarding International Patent Application No. PCT/US2016/026763, dated Jul. 19, 2016.

* cited by examiner

SCROLL COMPRESSOR LOWER BEARING

CROSS-REFERENCE TO RELATED APPLICATIONS

This application claims the benefit of U.S. Provisional Application No. 62/145,935, filed on Apr. 10, 2015. The entire disclosure of the above application is incorporated herein by reference.

FIELD

The present disclosure relates to a compressor, and more particularly to a lower bearing for a scroll compressor.

BACKGROUND

This section provides background information related to the present disclosure and is not necessarily prior art.

Bearings and bearing assemblies are used in various types of machinery and industrial equipment, such as rotary type compressors. A scroll compressor, for example, may include one or more bearing assemblies. The bearing assemblies can support a driveshaft for rotation about an axis. In some configurations, the scroll compressor includes an upper bearing assembly and a lower bearing assembly. While known bearing assemblies have proven acceptable for their intended purpose, a continuous need in the relevant art remains. In this regard, it may be desirable to provide a robust, cost-effective bearing assembly that allows for quieter and more efficient operation of the scroll compressor or other piece of machinery. In this regard, in some situations it may also be desirable to provide a bearing assembly that can withstand large axial forces produced by the driveshaft.

SUMMARY

This section provides a general summary of the disclosure, and is not a comprehensive disclosure of its full scope or all of its features.

In one form, the present disclosure provides a compressor that may include a shell, a compression mechanism, a motor assembly, a driveshaft, and a bearing assembly. The compression mechanism and the motor assembly are disposed within the shell. The driveshaft is drivingly engaged with the motor and the compression mechanism for rotation about an axis. The driveshaft extends from a proximal end to a distal end having an axially extending passage. A bearing assembly is disposed within the shell and supports the driveshaft for rotation. The bearing assembly includes a bracket, a hub, and a bushing. The bracket is coupled to the shell and includes an aperture. The hub is disposed within the aperture and extends from a proximal end to a distal end. The hub defines a bore extending from the proximal end of the hub to the distal end of the hub. The bore includes a proximal portion, a distal portion, and a radially inwardly extending lip. The proximal portion defines a first diameter. The distal portion defines a second diameter that is greater than the first diameter. The radially inwardly extending lip defines a third diameter that is less than the first and second diameters. The bushing includes a proximal portion and a distal portion. The distal portion of the bushing includes a plurality of radially extending engagement features. The proximal portion of the bushing is disposed within the distal portion of the bore. The distal portion of the bushing is disposed within the distal portion of the bore such that the engagement features engage the lip of the hub.

In some configurations, the proximal portion of the bushing includes a radially extending flange having an upper thrust surface and a lower thrust surface opposite the upper thrust surface. The upper thrust surface may engage the distal end of the driveshaft. The lower thrust surface may engage the lip of the hub.

In some configurations, the proximal portion of the bushing defines a fourth outer diameter, and the distal portion of the bushing defines a fifth outer diameter that is less than the fourth outer diameter.

In some configurations, the bushing includes at least one channel in the upper thrust surface. The channel may extend radially outwardly from an aperture in the bushing to the proximal portion of the bushing.

In some configurations, the fourth outer diameter is less than the second diameter.

In some configurations, the plurality of engagement features define a polygonal cross section having a maximum outer diameter that is greater than the second diameter, and a minimum outer diameter that is less than the second diameter.

In some configurations, the distal end of the hub includes a plurality of apertures in fluid communication with the distal portion of the bore and in fluid communication with the shell.

In some configurations, the bracket includes at least one laterally extending edge having an axially extending fin.

In some configurations, the bracket includes a first laterally extending edge and a second laterally extending edge opposite the first laterally extending edge. The first laterally extending edge may include a first axially extending fin. The second laterally extending edge may include a second axially extending fin.

In another form, the present disclosure provides a bearing assembly having a hub and a bushing. The hub extends from a proximal end to a distal end. The hub includes a bore extending from and between the proximal and distal ends. The bore includes a proximal portion, a distal portion, and a lip. The proximal portion includes a first diameter. The distal portion includes a second diameter that is greater than the first diameter. The lip extends radially inwardly from the distal portion and includes a shoulder and an engagement surface. The shoulder extends radially inwardly from the distal portion. The engagement surface extends axially from the shoulder to the distal end of the hub. The bushing includes a proximal portion and a distal portion. The proximal portion of the bushing defines an upper thrust surface and a lower thrust surface opposite the upper thrust surface. The lower thrust surface engages the shoulder of the hub. The distal portion of the bushing is disposed within the bore of the hub and defines a third diameter that is less than the second diameter. The distal portion of the bushing includes a plurality of radially outwardly extending engagement features engaging the engagement surface of the hub.

In some configurations, each of the plurality of engagement features extends axially along the distal portion of the bushing.

In some configurations, each of the plurality of engagement features includes a chamfered surface proximate a distal end of the bushing.

In some configurations, the distal end of the hub includes at least one passage.

In some configurations, the at least one passage is in fluid communication with the distal portion of the aperture.

In some configurations, the engagement features define a polygonal shape.

In some configurations, a compressor includes a shell having a lubricant sump. The bearing assembly may be supported by the shell such that the bore is in fluid communication with the lubricant sump.

In some configurations, the bearing assembly includes a bracket having a radially extending plate portion having an aperture and at least one laterally extending edge. The hub may be disposed within the aperture. The at least one laterally extending edge may include an axially extending fin.

In some configurations, the bracket includes a first laterally extending edge and a second laterally extending edge opposite the first laterally extending edge. The first laterally extending edge may include a first axially extending fin. The second laterally extending edge may include a second axially extending fin.

In yet another form, the present disclosure provides a bearing assembly for rotatably supporting a driveshaft. The driveshaft extends from a proximal end to a distal end. The bearing assembly includes a hub and a bushing. The hub extends from a proximal end to a distal end and defines a bore extending from the proximal end of the hub to the distal end of the hub. The bore includes a proximal portion defining a first diameter, a distal portion defining a second diameter that is greater than the first diameter, and a radially inwardly extending lip defining a third diameter that is less than the first and second diameters. The bushing includes a radially extending flange and a plurality of radially extending engagement features. The radially extending flange includes an upper thrust surface engaging the distal end of the driveshaft and a lower thrust surface engaging the lip of the hub. At least a portion of the bushing is disposed within the distal portion of the bore such that the engagement features engage the lip of the hub.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1A:
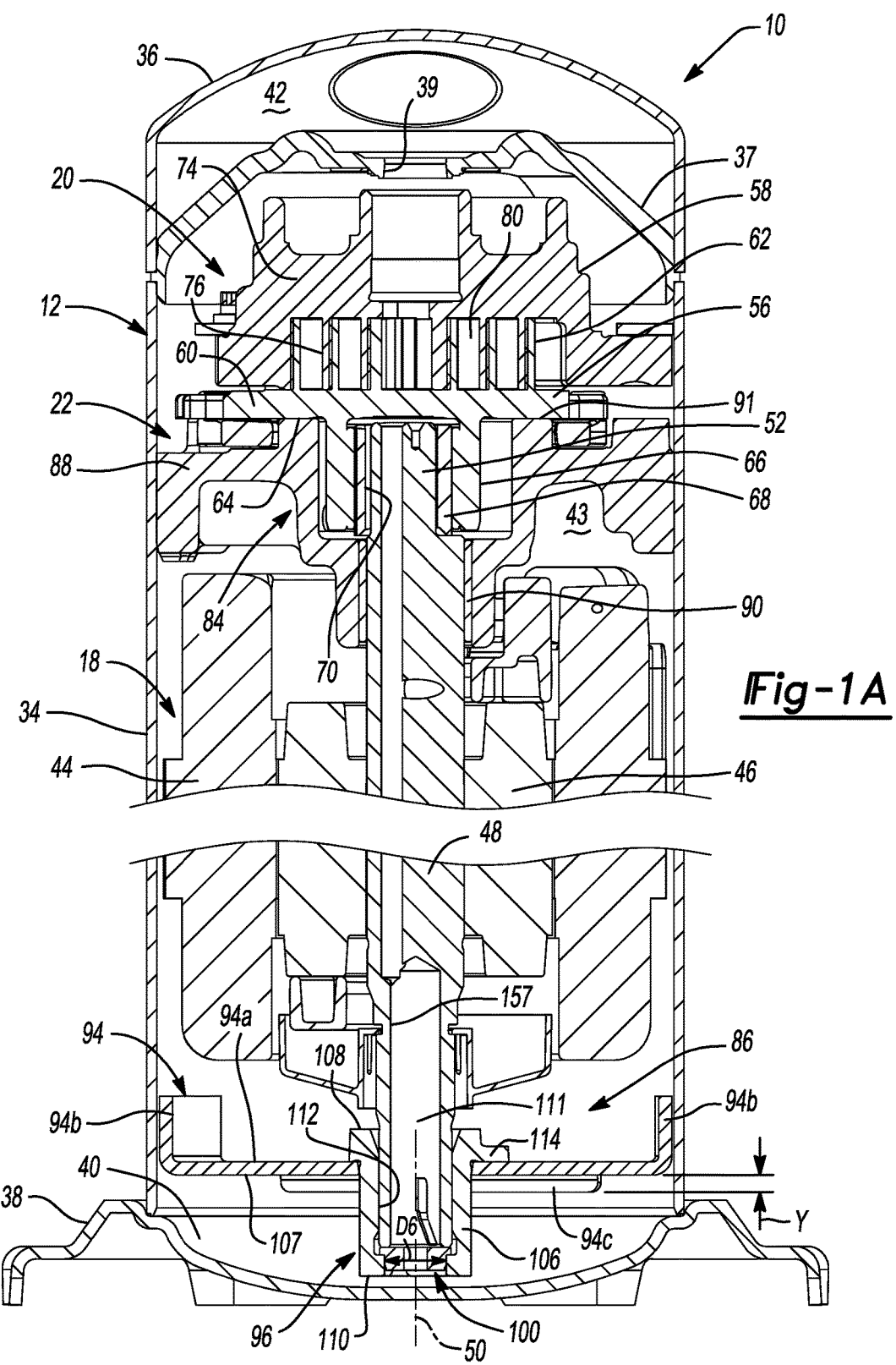
FIG. 1A is a cross-sectional view of a compressor having a lower bearing assembly according to the principles of the present disclosure.

With reference to FIG. 1A, a compressor 10 is provided that may include a shell assembly 12, a motor assembly 18, a compression mechanism 20, and a bearing housing assembly 22. The shell assembly 12 may house the motor assembly 18, the bearing housing assembly 22, and the compression mechanism 20. The shell assembly 12 may include a generally cylindrical shell 34, an end cap 36, a transversely extending partition plate 37, and a base 38. The end cap 36 may be fixed to an upper end of the shell 34. The base 38 may be fixed to a lower end of shell 34 and define a lubricant sump 40 for holding a lubricant (not shown). The end cap 36 and partition plate 37 may define a discharge chamber 42 (i.e., a discharge-pressure region) therebetween that receives compressed working fluid from the compression mechanism 20. The partition plate 37 may include an opening 39 providing communication between the compression mechanism 20 and the discharge chamber 42. The discharge chamber 42 may generally form a discharge muffler for the compressor 10. A discharge fitting (not shown) may be attached to the end cap 36 and may be in fluid communication with the discharge chamber 42. A suction inlet fitting (not shown) may be attached to the shell 34 and may be in fluid communication with a suction chamber 43 (i.e., a suction-pressure region). The partition plate 37 separates the discharge chamber 42 from the suction chamber 43.

The motor assembly 18 may include a motor stator 44, a rotor 46, and a driveshaft 48. The stator 44 may be press fit into the shell 34. The driveshaft 48 may be rotatably driven by the rotor 46 and supported by the bearing housing assembly 22 for rotation about an axis 50. The driveshaft 48 may include an eccentric crank pin 52 having a flat thereon for driving engagement with the compression mechanism 20. The rotor 46 may be press fit on the driveshaft 48.

The compression mechanism 20 may be driven by the motor assembly 18 and may generally include an orbiting scroll 56 and a non-orbiting scroll 58. The orbiting scroll 56 may include an end plate 60 having a spiral vane or wrap 62 on the upper surface thereof and an annular flat thrust surface 64 on the lower surface thereof. A cylindrical hub 66 may project downwardly from the thrust surface 64 and may have a drive bushing 68 disposed therein. The drive bushing 68 may include an inner bore 70 in which the crank pin 52 is drivingly disposed. The crank pin 52 may drivingly engage a flat surface in a portion of the inner bore 70 of the drive bushing 68 to provide a radially compliant driving arrangement.

The non-orbiting scroll 58 may include an end plate 74 and a spiral wrap 76 extending from a lower surface thereof. The spiral wraps 62, 76 cooperate to form a plurality of fluid pockets 80 therebetween. While the compression mechanism 20 is generally illustrated and described herein as being a scroll compression mechanism, including the orbiting scroll 56 and the non-orbiting scroll 58, it will be appreciated that the compression mechanism 20 may include other rotary-type compression mechanisms within the scope of the present disclosure.

The bearing housing assembly 22 may include a main or upper bearing assembly 84 and a lower bearing assembly 86. The main and lower bearing assemblies 84, 86 may be fixed within the shell 34. The main bearing assembly 84 may include a main bearing housing 88 and a main or upper bearing 90. The main bearing housing 88 may include an annular flat thrust bearing surface 91 that supports the compression mechanism 20 thereon. In this regard, the annular flat thrust bearing surface 91 may interface with the thrust surface 64 on the end plate 60 of the orbiting scroll 56. The upper bearing 90 may support the driveshaft 48 for rotation therein.

With reference to FIGS. 1A-3, the lower bearing assembly 86 may include a bracket 94, a hub 96, and a bushing 100. While the lower bearing assembly 86 is generally described herein as being below the upper bearing assembly 84, it will be appreciated that the relation of the lower bearing assembly 86 relative to the upper bearing assembly 84 will depend upon the orientation of the compressor 10. Accordingly, the lower bearing assembly 86 may be above the upper bearing assembly 84 within the scope of the present disclosure.

Figure 2:
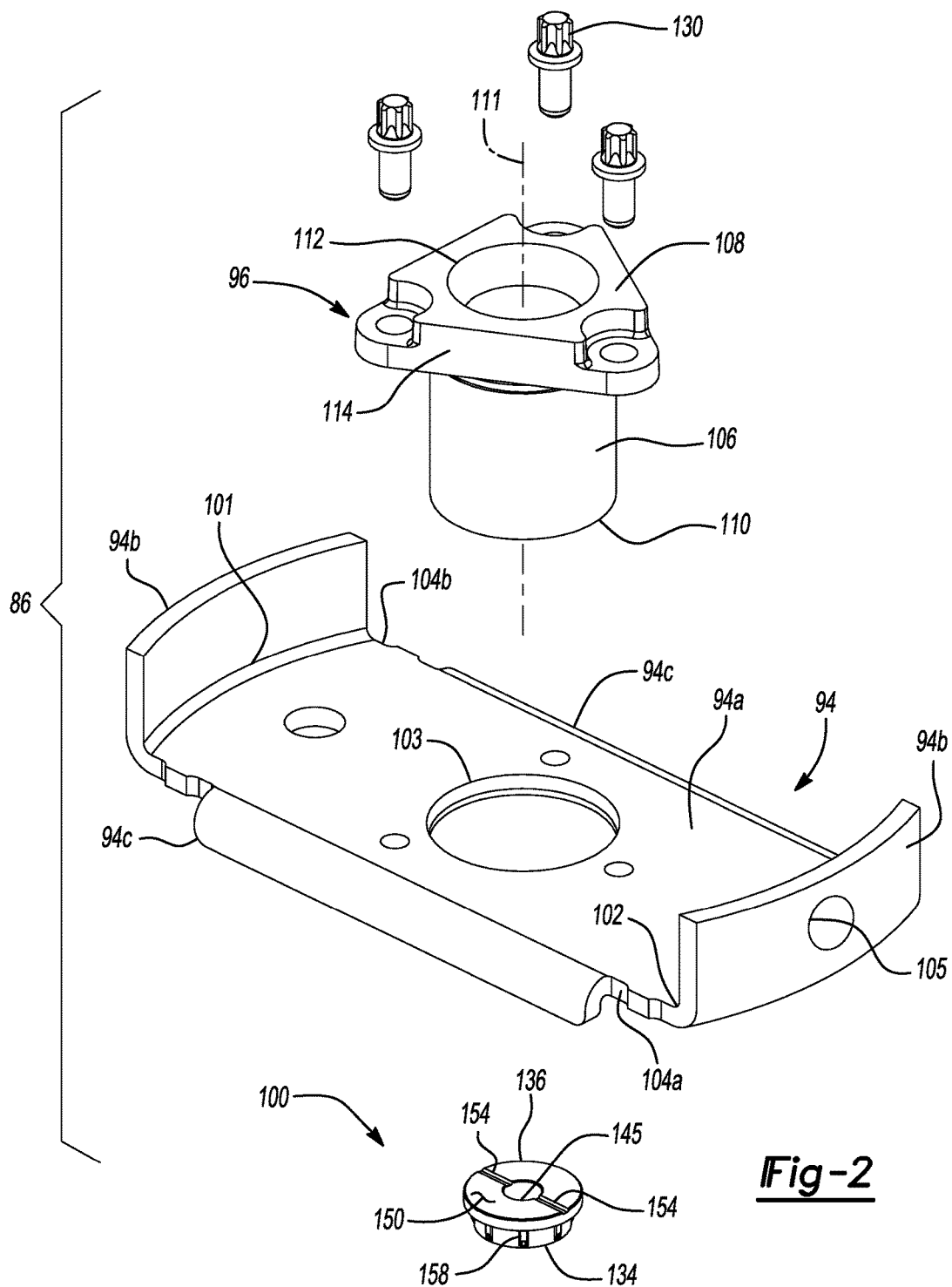
FIG. 2 is an exploded view of the lower bearing assembly of FIG. 1A.
Figure 3:
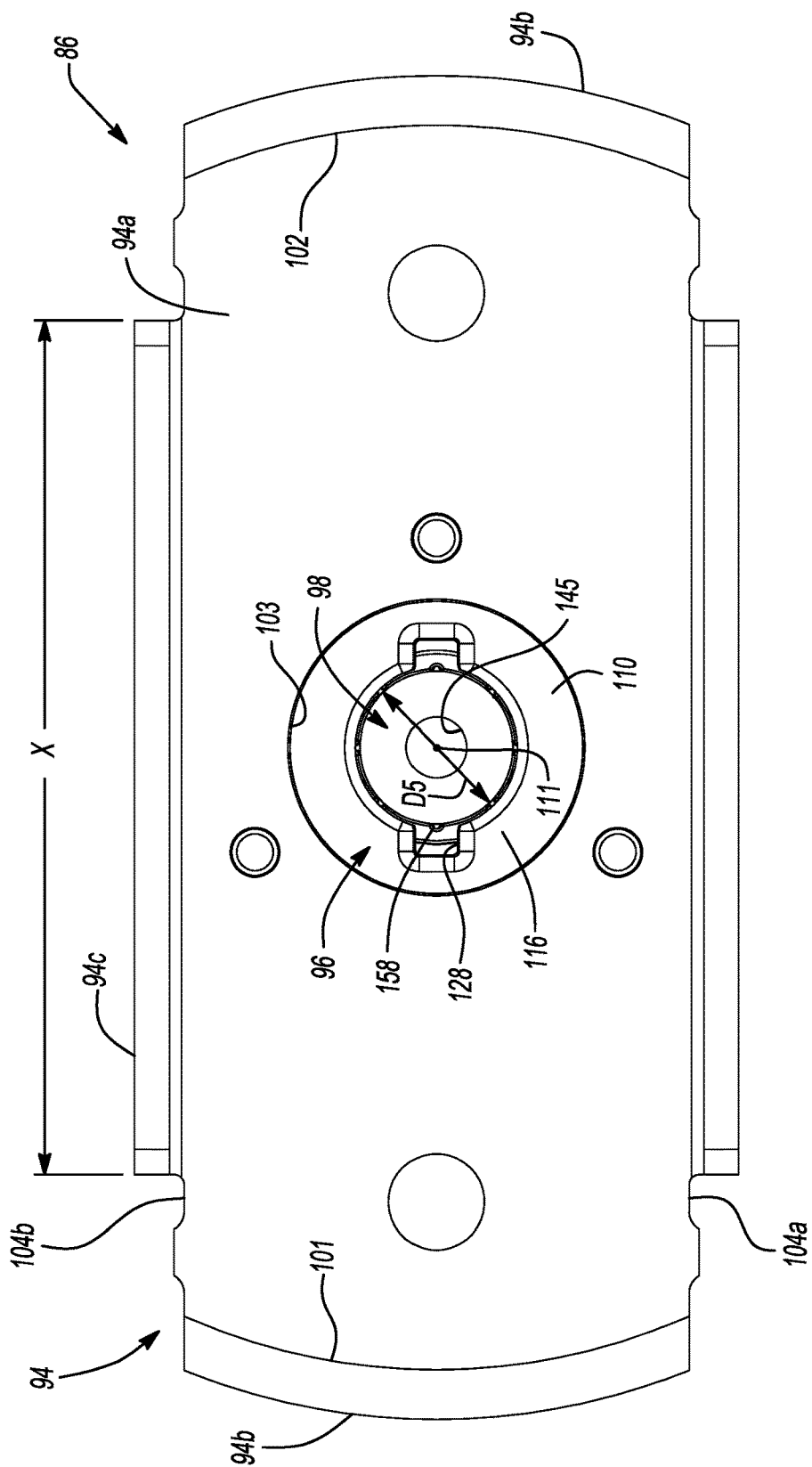
FIG. 3 is a bottom end view of the lower bearing assembly of FIG. 1A.

With reference to FIGS. 2 and 3, the bracket 94 may include a radially extending portion 94a, at least one axially extending portion 94b, and at least one flange or fin portion 94c. The radially extending portion 94a may extend from and between opposed first and second ends 101, 102. The radially extending portion 94a may include a central aperture 103, and a pair of opposed edges 104a, 104b extending from and between the first and second ends 101, 102. The axially extending portion 94b may extend axially upward (relative to the view in FIG. 2) from the first and/or second ends 101, 102 of the radially extending portion 94a. The bracket 94 may be mounted or otherwise fastened to the shell 34 using various techniques such as welding, staking, mechanically fastening, or press-fitting, for example. In this regard, as illustrated in FIG. 2, in some configurations the axially extending portion 94b of the bracket 94 may include one or more apertures 105 for staking the bracket 94 to the shell 34.

The fin portion 94c of the bracket 94 may extend from at least one of the edges 104a, 104b of the radially extending portion 94a. In this regard, as illustrated in FIG. 2, in some configurations the bracket 94 may include fin portions 94c extending axially downward (relative to the view in FIG. 2) from each of the opposed edges 104a, 104b. The fin portions 94c may extend along the edges 104, 104b a distance X (FIG. 3), and below a lower surface 107 of the radially extending portion 94a by a depth Y (FIG. 1A). The distance X may be between forty percent and ninety percent of the distance between the first and second ends 101, 102 of the radially extending portion 94a. In some configurations, the distance X may be eighty percent of the distance between the first and second ends 101, 102. The depth Y may be between two percent and twenty percent of the distance X. In some configurations, the depth Y may be five percent of the distance X. Accordingly, the fin portions 94c can increase the axial stiffness of the bracket 94. In this regard, the ratio of the distance X to the distance between the first and second ends 101, 102 of the radially extending portion 94a, and the ratio of the depth Y to the distance X, can help to determine a natural frequency of the lower bearing assembly 86. Specifically, changing the value of the distance X and/or the depth Y can change the natural or resonant frequency of the lower bearing assembly 86. Accordingly, the distance Y and the depth X of the fin portion 94c can prevent the lower bearing assembly 86 from resonating when the driveshaft 48 is rotated at various angular velocities.

Figure 1B:
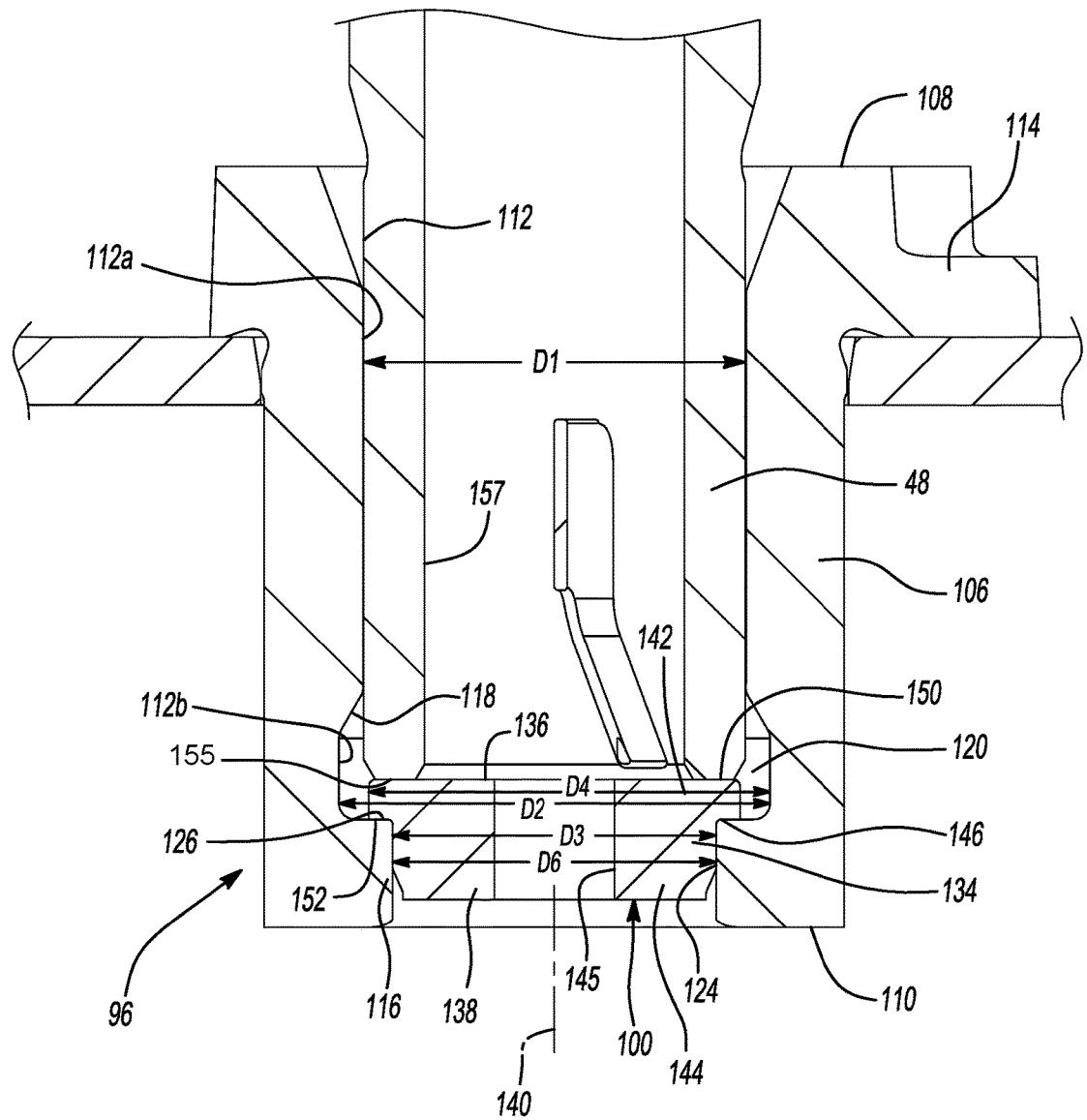
FIG. 1B is a cross-sectional view of a portion of the lower bearing assembly of FIG. 1A according to the principles of the present disclosure.

With reference to FIGS. 1A, 1B, and 2, the hub 96 may include a generally cylindrical body 106 extending from a proximal end 108 to a distal end 110 along an axis 111. In some configurations the body 106 may be formed from a die-cast aluminum. It will be appreciated, however, that the body 106 can be formed from other materials, including other metallic materials, for example, within the scope of the present disclosure. In an assembled configuration, the hub 96 may be disposed within the aperture 103 of the bracket 94.

With reference to FIG. 1A, the body 106 may include a bore or aperture 112 and a flange 114. The aperture 112 may extend through the body 106 from the proximal end 108 to the distal end 110. In some configurations, the aperture 112 may include or otherwise be defined by an upper portion 112a and a lower portion 112b. The upper portion 112a may include or otherwise define a first diameter D1, and the lower portion 112b may include or otherwise define a second diameter D2 that is larger than the first diameter D1. In this regard, the aperture 112 may include an annular undercut or shoulder 118 extending radially outwardly from the upper portion 112a to the lower portion 112b. As will be explained in more detail below, in an assembled configuration the shoulder 118 and the lower portion 112b of the aperture 112 may define a chamber 120 in the lower bearing assembly 86. In some configurations, the shoulder 118 may be tapered or inclined between the upper portion 112a and the lower portion 112b. In other configurations, the shoulder 118 may extend in a direction generally perpendicular to the upper and/or lower portions 112a, 112b.

A flange or lip 116 may extend radially inwardly within and relative to the aperture 112. In this regard, in some configurations the lip 116 may extend radially inwardly from the lower portion 112b of the aperture 112 proximate to the distal end 110 of the body 106. Accordingly, the lip 116 may define an axially extending peripheral or engagement surface 124 and a radially inwardly extending shoulder 126. The engagement surface 124 may define a third diameter D3 that is smaller than the first diameter D1 of the upper portion 112a of the aperture 112. With reference to FIG. 3, the lip 116 may include one or more axially extending passages or apertures 128 symmetrically disposed relative to the axis 111. As illustrated, in some configurations the lip 116 includes two apertures 128. The apertures 128 may define radially outwardly projecting slots or recesses in the engagement surface 124 of the lip 116. As will be explained in more detail below, in the assembled configuration the apertures 128 can fluidly communicate with the sump 40 and the chamber 120.

With reference to FIG. 2, the flange 114 may extend radially outwardly from the body 106. In an assembled configuration the flange 114 may be coupled to the bracket 94 to secure the hub 96 relative to the bracket 94. In this regard, the flange 114 may be coupled to the bracket 94 using various techniques such as welding or mechanical fasteners, such as bolts 130, for example.

Figure 4:
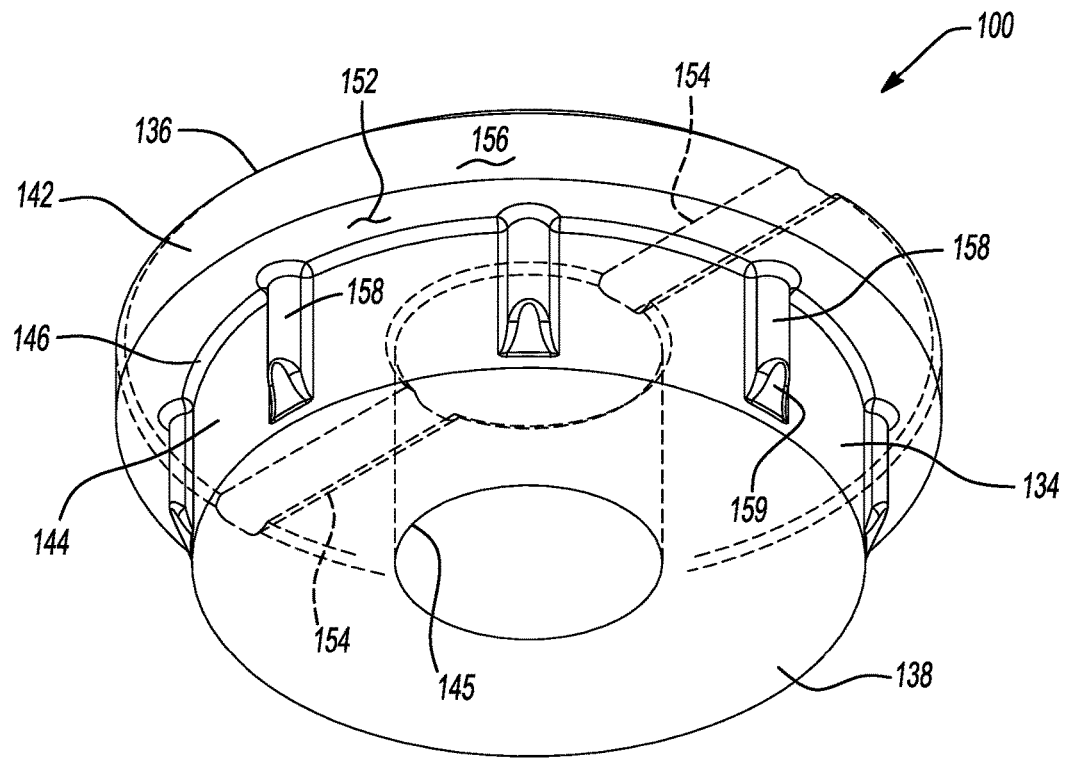
FIG. 4 is a perspective view of a thrust bushing of the lower bearing assembly of FIG. 1A.

With reference to FIGS. 1A, 1B, and 4, the bushing 100 may include a generally cylindrical body 134 extending from a proximal end 136 to a distal end 138 along an axis 140. As will be explained in more detail below, in an assembled configuration, the bushing 100 may be secured within the aperture 112 of the hub 96. In some configurations the bushing 100 may be formed from hardened steel. For example, the bushing 100 may be formed from a sintered powdered metal. Suitable powder metals include pre-alloyed steel powders (e.g., FL-4205), hybrid low-alloy steel powders (e.g., FLN-4205), diffusion-alloyed steel powders (e.g., FD-0405), and equivalents thereof. In certain aspects, a particularly suitable powder metal material for the bushing 100 is a hybrid low-alloy steel such as FLN2C-4005, FLN4C-4005, FLN-4205, FLN2-3905, FLN2-4400, FLN2-4405, FLN4-4400, FLN4-4405, FLN6-4405, FLNC-4405, or ANCORSTEEL 4300 (4300+0.6 gr) powder metal commercially available from Hoeganaes Corp. It will be appreciated, however, that the bushing 100 can be formed from other materials, including other metallic materials, for example, within the scope of the present disclosure. In this regard, the bushing 100 and hub 96 materials may be chosen or selected to create a preferred natural frequency for the lower bearing assembly 86.

The body 134 of the bushing 100 may include an upper or proximal portion 142, a lower or distal portion 144, and an aperture 145. The proximal portion 142 may extend from the proximal end 136 of the body 134, and the distal portion 144 may extend from the proximal portion 142 to the distal end 138 of the body 134, such that the proximal and distal portions 142, 144 meet at a joint 146. The joint 146 may include an arcuate or concave shape. The aperture 145 may extend axially from and between the proximal and distal ends 136, 138.

The proximal portion 142 of the body 134 may include a fourth width or diameter D4 (FIG. 1B) that is less than the first diameter D1 of the aperture 112 and greater than the third diameter D3 of the lip 116. The distal portion 144 of the body 134 may include a fifth width or diameter D5 (FIG. 3) that is less than the third diameter D3 of the lip 116 and the fourth diameter D4 of the proximal portion 142. In this regard, the proximal portion 142 may include or otherwise define a radially extending flange that is monolithically formed with the body 134. Accordingly, the proximal portion 142 may include an upper thrust surface 150 and a lower thrust surface 152 opposite the upper thrust surface 150. The upper thrust surface 150 may include one or more channels 154. As illustrated, in some configurations the upper thrust surface 150 includes two channels 154 symmetrically disposed about the axis 140 of the bushing 100. It will be appreciated, however, that the upper thrust surface 150 may include more than two channels 154 within the scope of the present disclosure. The channels 154 may extend radially outwardly from the aperture 145 to a peripheral surface 156 of the proximal portion 142. As will be explained in more detail below, in the assembled configuration, the upper thrust surface 150 of the proximal portion 142 may engage a distal end 155 of the driveshaft 48, and the lower thrust surface 152 may engage the shoulder 126 of the hub 96. Accordingly, the channels 154 may be in fluid communication with the chamber 120 and an axially extending bore 157 formed in the driveshaft 48.

With reference to FIG. 4, the distal portion 144 of the body 134 may further include one or more ribs or engagement features 158. The engagement features 158 may include a tapered or chamfered end 159 proximate to the distal end 138 of the bushing 100. The engagement features 158 may extend radially outwardly from the distal portion 144 of the bushing 100. The engagement features 158 may extend axially from the lower thrust surface 152 toward the distal end 138 of the bushing 100. As illustrated in FIG. 1B, the engagement features 158 may define an outer diameter D6. The diameter D6 may be less than the diameter D4 of the proximal portion 142 of the bushing 100, and greater than the diameters D3 of the lip 116 of the hub 96 and greater than the diameter D5 of the distal portion 144 of the bushing 100. Accordingly, in the assembled configuration the engagement features 158 may engage the engagement surface 124 of the hub 96 in a press-fit arrangement. As will be explained in more detail below, the press-fit arrangement of the bushing 100 relative to the hub 96 can act as a monolithic or unitary construct and allow the lower bearing assembly 86 to have a linear natural frequency.

Figure 5:
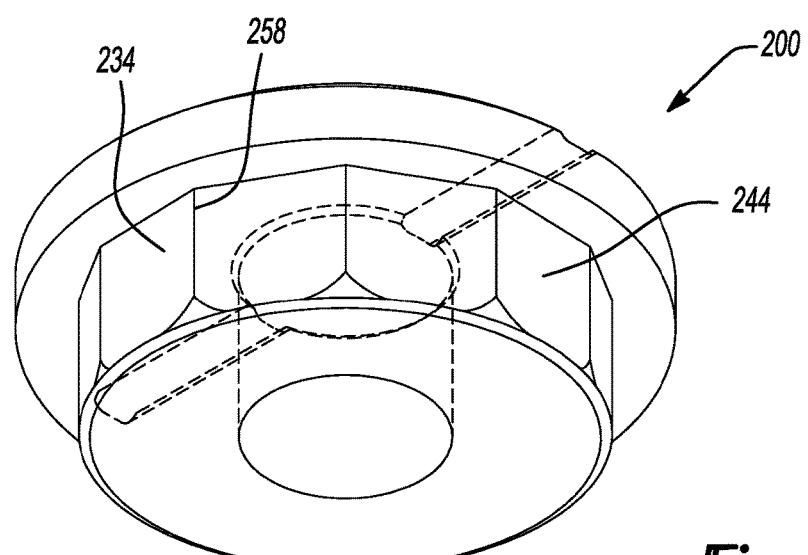
FIG. 5 is a perspective view of another thrust bushing of the lower bearing assembly of FIG. 1A.

With reference to FIG. 5, another bushing 200 is shown. The structure and function of the bushing 200 may be substantially similar to that of the bushing 100, apart from any exceptions described below and/or shown in the Figures. Therefore, the structure and/or function of similar features will not be described again in detail, and like reference numerals may be used to describe like features and components.

As illustrated, the bushing 200 may include a body 234 having a distal portion 244. The distal portion 244 may include or otherwise define a polygonal shape or configuration (e.g., triangle, square, pentagon, hexagon, etc.) having one or more engagement features 258. In the assembled configuration the engagement features 258 may engage the engagement surface 124 of the hub 96 in a press-fit arrangement.

During assembly of the compressor 10, the configuration of the diameters D1-D6, discussed above, allows a user to assemble the bushing 100, 200 relative to the hub 96 by inserting the bushing 100, 200 in an axial direction within the aperture 112 of the hub 96. The press-fit configuration of the engagement features 158, 258 with the engagement surface 124 of the hub 96 secures the bushing 100, 200 within the aperture 112. The monolithic construction of the proximal and distal portions 142, 144 of the body 134, the engagement of the driveshaft 48 with the upper thrust surface 150 of the proximal portion 142, and the configuration of the diameters D1-D6 can also improve the strength (e.g., shear strength) of the bushing 100, 200.

During operation of the compressor 10, the fin portions 94c of the bracket 94, the material forming the hub 96, the material forming the bushing 100, 200, and/or the monolithic construction of the proximal and distal portions 142, 144 of the body 134, 234 can allow the lower bearing assembly 86 to have a predetermined natural frequency. In this regard, the bearing assembly 86 can be manufactured to have a natural frequency that eliminates or otherwise reduces resonance as the driveshaft 48 rotates at various angular velocities within the lower bearing assembly 86.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A compressor comprising:
    a shell;
    a compression mechanism disposed within the shell
    a motor assembly disposed within the shell;
    a driveshaft drivingly engaged with the motor and the compression mechanism for rotation about an axis, the driveshaft extending from a proximal end to a distal end, the distal end having an axially extending passage;
    a bearing assembly disposed within the shell and supporting the driveshaft for rotation, the bearing assembly including
        a bracket coupled to the shell and having an aperture;
        a hub disposed within the aperture and extending from a proximal end to a distal end, the hub defining a bore extending from the proximal end of the hub to the distal end of the hub, the bore including a proximal portion defining a first diameter, a distal portion defining a second diameter that is greater than the first diameter, and a radially inwardly extending lip defining a third diameter that is less than the first and second diameters; and
        a bushing having a proximal portion and a distal portion, the distal portion of the bushing having a plurality of radially extending engagement features, the proximal portion of the bushing disposed within the distal portion of the bore, the distal portion of the bushing disposed within the distal portion of the bore such that the engagement features engage the lip of the hub.

2. The compressor of claim 1, wherein the proximal portion of the bushing includes a radially extending flange having an upper thrust surface and a lower thrust surface opposite the upper thrust surface, the upper thrust surface engaging the distal end of the driveshaft, the lower thrust surface engaging the lip of the hub.

3. The compressor of claim 2, wherein the bushing includes at least one channel in the upper thrust surface, wherein the channel extends radially outwardly from an aperture in the bushing to the proximal portion.

4. The compressor of claim 1, wherein the proximal portion of the bushing defines a fourth outer diameter, and the distal portion of the bushing defines a fifth outer diameter that is less than the fourth outer diameter.

5. The compressor of claim 4, wherein the fourth outer diameter is less than the second diameter.

6. The compressor of claim 1, wherein the plurality of radially extending engagement features define polygonal cross section having a maximum outer diameter that is greater than the third diameter, and a minimum outer diameter that is less than the third diameter.

7. The compressor of claim 1, wherein the distal end of the hub includes a plurality of apertures in fluid communication with the distal portion of the bore and in fluid communication with the shell.

8. The compressor of claim 1, wherein the bracket includes at least one laterally extending edge having an axially extending fin.

9. The compressor of claim 8, wherein the bracket includes a first laterally extending edge and a second laterally extending edge opposite the first laterally extending edge, the first laterally extending edge having a first axially extending fin, the second laterally extending edge having a second axially extending fin.

10. A bearing assembly comprising:
    a hub extending from a proximal end to a distal end, the hub including a bore extending from and between the proximal and distal ends, the bore including a proximal portion, a distal portion, and a lip, the proximal portion having a first diameter, the distal portion having a second diameter that is greater than the first diameter, the lip extending radially inwardly from the distal portion and having a shoulder and an engagement surface, the shoulder extending radially inwardly from the distal portion, the engagement surface extending axially from the shoulder to the distal end of the hub; and
    a bushing having a proximal portion and a distal portion, the proximal portion of the bushing defining an upper thrust surface and a lower thrust surface opposite the upper thrust surface, the lower thrust surface engaging the shoulder of the hub, the distal portion of the bushing disposed within the bore of the hub and defining a third diameter that is less than the second diameter, the distal portion of the bushing including a plurality of radially outwardly extending engagement features engaging the engagement surface of the hub.

11. The bearing assembly of claim 10, wherein each of the plurality of radially outwardly extending engagement features extends axially along the distal portion of the bushing.

12. The bearing assembly of claim 11, wherein each of the plurality of radially outwardly extending engagement features includes a chamfered surface proximate a distal end of the bushing.

13. The bearing assembly of claim 10, wherein the distal end of the hub includes at least one passage.

14. The bearing assembly of claim 13, wherein the at least one passage is in fluid communication with the distal portion of the bore.

15. The bearing assembly of claim 10, wherein the engagement features define a polygonal shape.

16. A compressor comprising the bearing assembly of claim 10, the compressor including a shell having a lubricant sump, wherein the bearing assembly is supported by the shell such that the bore is in fluid communication with the lubricant sump.

17. The bearing assembly of claim 10, further comprising a bracket having a radially extending plate portion having an aperture and at least one laterally extending edge, the hub disposed within the aperture, the at least one laterally extending edge having an axially extending fin.

18. The bearing assembly of claim 17, wherein the bracket includes a first laterally extending edge and a second laterally extending edge opposite the first laterally extending edge, the first laterally extending edge having a first axially extending fin, the second laterally extending edge having a second axially extending fin.

19. A bearing assembly for rotatably supporting a driveshaft, the driveshaft extending from a proximal end to a distal end, the bearing assembly comprising:
    a hub extending from a proximal end to a distal end, the hub defining a bore extending from the proximal end of the hub to the distal end of the hub, the bore including a proximal portion defining a first diameter, a distal portion defining a second diameter that is greater than the first diameter, and a radially inwardly extending lip defining a third diameter that is less than the first and second diameters; and
    a bushing having a radially extending flange and a plurality of radially extending engagement features, the radially extending flange including an upper thrust surface engaging the distal end of the driveshaft and a lower thrust surface engaging the lip of the hub, at least a portion of the bushing disposed within the distal portion of the bore such that the engagement features engage the lip of the hub.

20. The bearing assembly of claim 19, further comprising a bracket including a radially extending plate portion having an aperture and at least one laterally extending edge, the hub disposed within the aperture, the at least one laterally extending edge having an axially extending fin.

* * * * *